Sept. 18, 1928.
G. B. CADY
1,684,909
CROSS CHAIN LINK
Filed April 2, 1926
FIG. 1.
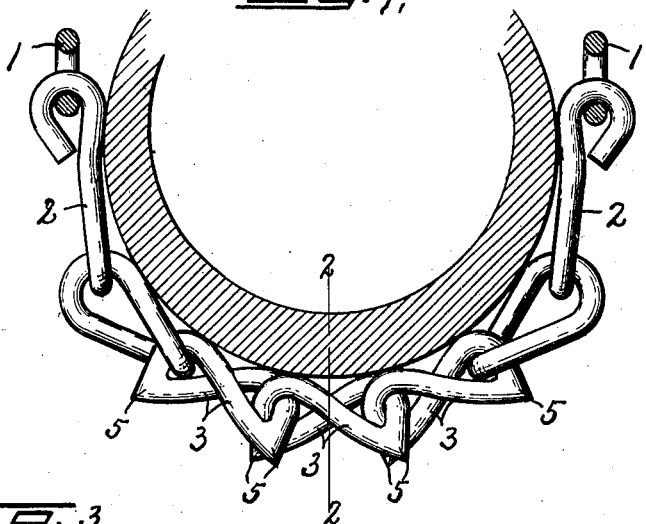
FIG. 3.
FIG. 2.
FIG. 4.
FIG. 5.
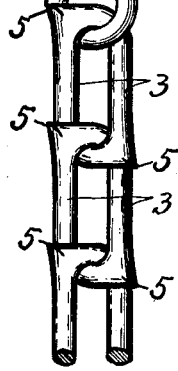
INVENTOR
G. B. Cady
BY Denison + Thompson
ATTORNEYS
WITNESS
H. Hurst.

Patented Sept. 18, 1928.

1,684,909

UNITED STATES PATENT OFFICE.

GEORGE B. CADY, OF CANASTOTA, NEW YORK.

CROSS-CHAIN LINK.

Application filed April 2, 1926. Serial No. 99,271.

This invention relates to an anti-skid device for automobile wheels and refers more particularly to the links in the cross chains connecting the side chains.

These cross chains are usually made of twisted steel links to enable them to lie more or less flatwise against the periphery of the tire to prevent abrasion or undue wear of the tire, but it has been found that while they are highly efficient for traction purposes in propelling the machine and preventing longitudinal skidding when the rotation of the wheels is stopped by the setting of the brakes it is well known that they do not prevent lateral skidding of the wheels and in fact facilitate the lateral skidding, particularly on ice and snow by reason of the continuity of smoothness of their traction surfaces.

The main object of the present invention is to not only utilize these twisted links for traction purposes and to prevent circumferential slipping of the wheels on wet or ice covered pavements but also to construct the ends of the links in such manner as to resist lateral skiding or slipping and at the same time to increase the resistance to circumferential skidding.

Other objects and uses relating to specific parts of the cross chain will be brought out in the following description.

In the drawings:—

Figure 1 is a cross sectional view of a portion of a tire and one of the cross chains together with portions of the side chains.

Figure 2 is a sectional view of one of the links taken in the plane of line 2—2, Figure 1.

Figure 3 is a side elevation of one side of the detached cross chain.

Figure 4 is a sectional view through one of the links.

Figure 5 is an end view of another link adapted to be interlocked with the link shown in Figure 4.

As illustrated, this anti-skid device comprises opposite side chains —1— adapted to extend circumferentially around opposite sides of the tire, and a cross chain composed of attaching links —2— and tread links —3—.

Each of the tread links —3— is preferably made of round steel wire and is twisted so that when viewed in side elevation the side members cross each other in spaced relation substantially midway between the ends and when viewed in top plan or inverted plan the side members are substantially parallel forming a lengthwise slot of substantially uniform width between them.

It will be noted however that instead of making the end members of each link rounding or semi-circular from side to side two of the diagonally opposite corners are substantially rectangular to form relatively sharp points —5— facing endwise in opposite directions while the other two diagonally opposite corners are rounding.

In other words, the joined portions of the side members and end members at diagonally opposite corners of each link are substantially straight or at substantially right angles to each other to form the relatively sharp points —5— while the other two diagonally opposite corners are rounded longitudinally so that when the links are twisted the rounded corners will be brought to one side of the longitudinal plane of the crossing members while the points —5— will be brought to the opposite side of the said plane.

In attaching the cross chains to the side chains the sides of the links having the rounding corners will be brought against the periphery of the tire while the diagonally opposite points —5— will face outwardly and in opposite directions endwise for engaging the pavement to resist lateral skidding of the wheel in either lateral direction.

It will be observed that the attaching links —2— are bent into the form of substantially flat open loops while the ends of each loop are bent at right angles to the plane of the loop to form suitable eyes or hooks for interlocking engagement with one of the links of the side chain thereby holding the loop substantially flatwise relatively to the adjacent face of the tire and also serving to hold the cross links with their rounded edges in contact with the periphery of the tire by reason of the peculiar twist given to each link.

Each tread link may be made in two similar L-shaped sections so that the free end of one side member and the free end of its end member will be substantially straight.

Then by reversing the members the free end of each end member will be welded to the free end of the other side member to form the biting points —5—.

It is evident, however, that these links may be otherwise formed to produce the diagonally opposite biting points —5— without departing from the spirit of this invention.

What I claim is:—

A tread link for cross chains of antiskid devices twisted so that its opposite sides cross each other in spaced relation substantially midway between its ends, two of the diagonally opposite corners of said link forming relatively sharp angles, the other two corners being rounded longitudinally, the rounded corners being disposed at one side of the plane of crossing of the sides and the other two diagonal corners being disposed at the opposite side of said plane, the distance between the apexes of the rounded corners being less than the distance between the apexes of the other corners.

In witness whereof I have hereunto set my hand this 22nd day of March, 1926.

GEORGE B. CADY.